US005895514A

United States Patent [19]

DiFrank

[11] Patent Number: 5,895,514
[45] Date of Patent: Apr. 20, 1999

[54] GLASS GOB DISTRIBUTOR AND OIL LUBRICATION SYSTEM THEREFOR

[75] Inventor: Frank J. DiFrank, Toledo, Ohio

[73] Assignee: Owens-Illinois Inc., Toledo, Ohio

[*] Notice: This patent is subject to a terminal disclaimer.

[21] Appl. No.: 08/857,786

[22] Filed: May 16, 1997

Related U.S. Application Data

[63] Continuation of application No. 08/589,506, Jan. 22, 1996, Pat. No. 5,683,485, which is a continuation-in-part of application No. 08/541,052, Oct. 11, 1995, abandoned.

[51] Int. Cl.⁶ .................... C03B 7/14; C03B 7/00; C03B 9/16; C03B 9/20
[52] U.S. Cl. .................... 65/304; 65/303; 65/225
[58] Field of Search ................ 65/222, 225, 303, 65/304

[56] References Cited

U.S. PATENT DOCUMENTS 5,135,559  8/1992  Sasso et al. .................... 65/158
5,458,668  10/1995  Shoji .................... 65/222
5,683,485  11/1997  DiFrank .................... 65/304

*Primary Examiner*—Peter Chin
*Assistant Examiner*—Jacqueline A. Ruller

[57] ABSTRACT

A gob distributor for distributing gobs of molten glass from an orifice of a glass melter feeder bowl to a plurality of delivery chutes, each of which leads to a section of a glass forming machine of the individual section type, said gob distributor including an a.c. servo motor with a vertical output shaft, a gob scoop having an inlet end positioned beneath the orifice and an outlet end positioned in alignment with one or the other of the delivery chutes, and a driven member to which the gob scoop is attached for oscillating movement of the gob scoop in an indexing manner. The driven member includes a shaft that is parallel to and spaced from the output shaft, and an endless positive drive, in the form of an endless cogged timing belt or a pair of double-ended metal chain sections joined end-to-end by adjustable length connectors, is provided to transmit torque from the output shaft of the motor and the shaft of the driven member. A lubricating oil circulating system is provided to circulate pressurized cooling oil successively through enclosed bearings that are provided to rotatably support the output shaft of the motor and the shaft of the driven member.

24 Claims, 7 Drawing Sheets

GLASS GOB DISTRIBUTOR AND OIL LUBRICATION SYSTEM THEREFOR

CROSS-REFERENCE TO RELATED APPLICATION

This is a continuation, of application Ser. No. 08/589,506, filed Jan. 22, 1996, now U.S. Pat. No. 5,683,485 issued Nov. 4, 1997, which is a continuation-in-part of my U.S. patent application Ser. No. 08/541,052 filed Nov. 11, 1995 now abandoned.

FIELD OF THE INVENTION

This invention relates to a gob distributor for sequentially delivering gobs of molten glass to the blank molds of a glass container forming machine of the individual section ("IS") type. More particularly, this invention relates to a low backlash drive mechanism for driving a gob distributor of the foregoing type. The invention also relates to a recirculating lubricating oil system for lubricating the bearings of a gob distributor of the foregoing type.

BACKGROUND OF THE INVENTION

Glass containers are typically formed by an IS machine, that is, a machine with multiple side by side sections, such as six or eight or even ten sections, and in modern practice multiple containers, such as three or four containers, are often simultaneously formed at each section by a process commonly referred to as the multiple gob process. In any case, a gob distributor is required to sequentially distribute gobs of molten glass to each section of an IS machine, and a multiplicity of such gob distributors are required for a multiple gob IS machine, one gob distributor for each of the sets of molds (blank mold/container mold) of an IS machine section.

Each gob distributor of the type described above has a curved scoop and requires a drive unit to index an oscillating member to which the scoop is attached. The oscillating member is driven in a series of incremental steps as the scoop sequentially aligns itself with a series of gob chutes, one leading to one of the blank molds at each of the sections of the IS machine. During the pause of the gob distributor scoop at each IS machine section chute, a gob of molten glass from an outlet orifice of the feeder bowl of a glass melting furnace forehearth, after severing of a stream of molten glass therefrom into a gob of predetermined weight, passes through the scoop of the distributor and then through the chute into a blank mold of the IS machine section. The scoop of the gob distributor must be at rest as the gob passes therethrough, to avoid slinging of the gob due to centrifugal force, and it must be very precisely aligned with the blank mold chute as the gob passes from the scoop into the chute.

A typical drive unit for an IS forming machine gob distributor incorporates a power source with a vertical output shaft and a driven member to which the gob scoop oscillating member is attached. The driven member has a vertical input shaft, which is spaced from the output shaft of the power source. Heretofore, torque was transmitted from the output shaft of the power source to the input shaft of the driven member through a gear train. However, a gear train inherently has a relatively high amount of backlash associated with it, which interferes with the precise positioning of the gob scoop with respect to the blank mold chutes it is to be sequentially aligned with. This problem is compounded in modern IS machine installations where the gob distributor may be required to cycle as often as 25 times per minute, whereas typical older installations required cycle rates of no more than 15 to 17 times per minute. Further, higher cycle rates introduce maintenance and lubrication problems into a gob distributor system, which increase the complexity, and therefore the expense, of such a system, and the frequency of required maintenance shutdowns.

Bearings of prior art gob distributors must be continuously lubricated. Heretofore such lubrication was accomplished by a viscous grease that was sealed within the gob distributor. Occasionally, however, such grease lubrication systems were subject to undesirable moisture condensation therein and/or the incapability of the grease reaching remote regions of the gob distributor for proper lubrication of the components located in such region.

Known prior art IS machine gob distributor systems are disclosed in U.S. Pat. No. 5,135,559 (Sasso et al.), in U.S. Pat. No. 4,529,431 (Mumford) and in U.S. Pat. No. Re. 28,759 (Bystrianyk et al.), the disclosure of each of which is incorporated by reference herein.

SUMMARY OF THE INVENTION

According to the present invention there is provided a distributor for sequentially delivering gobs of molten glass from the feeder bowl of a glass melting furnace forehearth to a series of gob chutes associated with a set of the blank molds of the sections of an IS forming machine. The gob distributor of the present invention replaces the backlash-prone gear train or other drives for transferring torque from the outlet shaft of a drive unit to a parallel input shaft of an oscillating member, to which a gob scoop is attached, by an endless belt or chain drive. A belt drive for such a gob distributor, which does not need to be lubricated in service, or a chain drive for such a gob distributor, which does need to be lubricated in service, can be designed to operate at high cycle rates and within acceptable backlash requirements by sizing the belt or chain based on maximum permissible stretch considerations, as opposed to strength considerations. Such a belt or chain drive will inherently be lower in maintenance requirements and more friction-free than a gear train drive, especially in high cycle rate glass forming installations, and can readily be provided with tension adjustments to permit changing the spacing between the output and driven shafts in the case of a belt drive, or the length of the chain in the case of a chain drive.

Accordingly, it is an object of the present invention to provide an improved glass gob distributor for a glass forming machine of the individual section type. More particularly, it is an object of the present invention to provide a gob distributor of the foregoing type which is capable of operating at high cycle rates and within acceptable backlash specifications. It is also an object of the present invention to provide a lubricating system for lubricating the bearings of such a gob distributor that is free from the operating problems associated with prior art gob distributor lubricating systems.

For a further understanding of the present invention and the objects thereof, attention is directed to the drawing and to the following brief description thereof, to the detailed description of the preferred embodiment, and to the appended claims.

IN THE DRAWING

DETAILED DESCRIPTION OF THE PREFERRED EMBODIMENT

Figure 1:
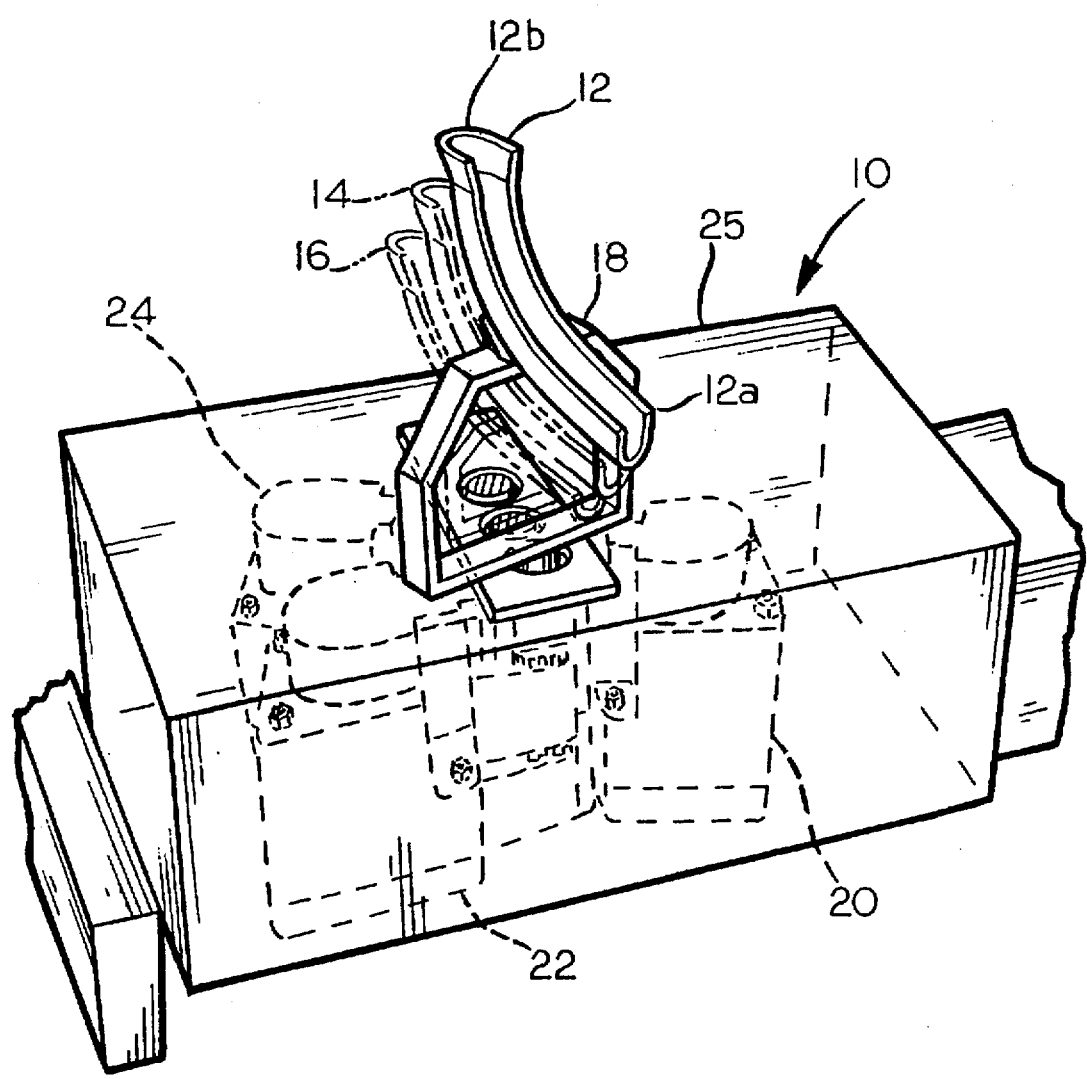
FIG. 1 is a fragmentary, perspective view of a glass gob distributor according to the preferred embodiment of the present invention.

The gob distributor according to the preferred embodiment of the present invention is indicated generally by reference numeral 10 in FIG. 1. The gob distributor 10 is designed for use with a triple gob IS glass forming machine, not shown, which, typically, will have six or eight or ten individual sections aligned side by side in a known manner. In triple gob operation, three containers will be simultaneously formed at each IS machine section, three blanks or parisons being formed in separate molds at a blank mold station of each such IS machine section and three containers being formed from such parisons in separate molds at a container mold station of such IS machine section, all as is known in the art.

As a gob distributor for a triple gob IS machine, the gob distributor 10 is provided with three gob scoops 12, 14, 16, one for each set of blank molds, the gob scoops 14, 16 being shown in outline only for the sake of clarity. Each of the gob scoops 12, 14, 16 is attached to a frame, such as the frame 18 for the gob scoop 12. The frame 18, as well as the frames to which the gob scoops 14, 16 are attached, are caused to oscillate in an arc, typically approximately 120° in length, in an indexing manner to successively align an outlet from each gob scoop, such as the outlet 12a from the gob scoop 12, with a gob chute, not shown, at each IS machine section. In any case, an inlet to each gob chute, such as the inlet 12b to the gob chute 12, is maintained in alignment with an outlet orifice on the glass melting furnace forehearth, also not shown, during the indexing of each of gob scoops 12, 14, 16, such as the gob chute 12.

The oscillation of the frames to which the gob scoops 12, 14, 16 are attached, such as the frame 18 to which the gob scoop 12 is attached, are powered by like drive units 20, 22, 24, respectively, which are enclosed within a metallic covering 25 to avoid inadvertent damage to the drive units 20, 22, 24 from contact with molten glass. Each of the drive units 20, 22, 24 is powered by a reversible motor that is capable of operating in an indexing fashion, preferably an a.c. servo motor, such as the motor 26 of the drive unit 20. The motor 26 of the drive unit 20 is provided with a vertically extending output shaft 28, and torque is transmitted from the output shaft 28 to a driven shaft 30, to which the frame 18 is secured, by an endless cogged timing belt 32, which is trained around suitable pulleys 34, 36 on the output shaft 28 and the driven shaft 30, respectively. Preferably, for a typical gob distributor installation, the motor 26 incorporates a 12:1 gear ratio zero backlash gearbox.

The belt 32, which inherently is of a non-slip character, is preferably of a non-metallic material with a plurality of spaced apart, metallic reinforcing elements encased within the non-metallic material. A non-metallic material that has been found to be suitable for use as the belt 32, in an installation where the center-to-center spacing between the axes of the output shaft 28 and the driven shaft 32 is one hundred seventy millimeters, is a four-inch (one hundred millimeters) wide, 0.080 in (1.2 mm chord) steel cable reinforced polyurethane. Such belts are available by special order from BRECOflex CO., L.L.C. of Eatontown, N.J. under their AT 10 (10 millimeter tooth center to tooth center spacing) product designation. Such a belt was designed based on stretch or backlash considerations, as opposed to strength considerations, and limits calculated backlash or stretch at the outlet from each gob scoop, such as the outlet 12a from the gob scoop 12, to less than 0.04 inches (peak load stretch), which is within acceptable limits. Suitable timing pulleys for use as the pulleys 34, 36 are also available from BRECOflex. The use of a belt with 10 millimeter tooth to tooth center spacing permits the use of small pulleys, which are required because of the small center to center spacing between the axes of the drive and driven members, while the use of a larger than standard reinforcing cable limits belt stretch to that more typical of belts with 20 millimeter tooth center to tooth center spacing (AT-20).

To maintain a predetermined level of tension in the belt 32, the center-to-center spacing between the output shaft 20a and the driven shaft 30 is adjustable. This is accomplished by mounting a driven shaft 30 on a frame member 28 that is slidably connected to a frame member 40 to which the output shaft 28 is mounted, threaded fasteners 42 being provided to secure the frame member in a locked position relative to the frame member 40 once a suitable level of tension has been established in the belt 32. A tapered separator 44 separates the frame member 38 and the frame member 40, and the separator can be raised or lowered to assist in decreasing or increasing, as the case may be, the center-to-center spacing between the frame member 38 and the frame member 40. In that regard, the tapered separator 44 is provided with an inclined face 44a that engages a similarly inclined face 38a of the frame member 38, and a threaded adjusting screw 46 is provided to assist in raising and lowering the tapered separator 44 with respect to the frame member 38 and the frame member 40. As shown, the output shaft 28 of the motor 26 is rotatably journalled in the frame member 40 by upper and lower bearings 48, 54, respectively and the driven shaft is rotatably journalled in the frame member 38 by upper and lower bearings 50, 52, respectively.

Even though the belt 32 and the pulleys 34, 36 do not need to be lubricated in service, it is necessary to continuously lubricate the bearings 48, 50, 52 for the proper operation thereof. In accordance with the present invention, the bearings 48, 52, 50 are continuously lubricated by circulating a stream of lubricating oil through such bearings, in series. To that end, the bearing 48 is contained with an enclosed chamber 54, the bearing 52 is contained within an enclosed chamber 56 and the bearing 50 is contained within an enclosed chamber 58. A lubricating oil recirculating pump of conventional construction, not shown, delivers pressurized lubricating oil to a distributor 60 by an inlet line 62. The distributor 60 delivers pressurized oil to the chamber 54 through a conduit 64 and an internal passage 66 and the pressurized oil from the chamber 54 then flows to the chamber 56 through a conduit 68 and a passage 70. Pressurized oil from the chamber 56 then flows to the chamber 58 through a passage 72 into the chamber 58, and from the chamber 58 back to the distributor 60 through a passage 74 and a conduit 76. From the distributor 60 the spent oil is returned by way of a conduit 78 to the pump for repressurization and filtering before being returned to the distributor 60 through the inlet line 62.

The motor 26 is provided with a bearing 80 that is contained within an enclosed chamber 82, and pressurized lubricating oil from the distributor 60 is circulated to the chamber 82 by way of a conduit 84 and a passage 86. Spent lubricating oil from the chamber 82 is returned to the distributor 60 by way of a passage 88 and a conduit 90, and is then returned to the pump for repressurization by way of the conduit 78.

The use of recirculated lubricating oil in the lubrication of the bearings, 48, 50, 52, 80, as heretofore described, prevents moisture from condensing within such bearings upon a sudden drop in temperature from conditions of high temperature and high humidity. It also permits continuous filtration of the lubricating medium, and it provides for some cooling of the lubricating medium solely by virtue of its flow through conduits 64, 68, 76, 78, 84 and the inlet line 62, which are exposed to ambient temperature conditions. Further, if additional cooling is needed or desired, the recirculating oil can be positively cooled during its flow between the distributor 60 and the pump.

Figure 2:
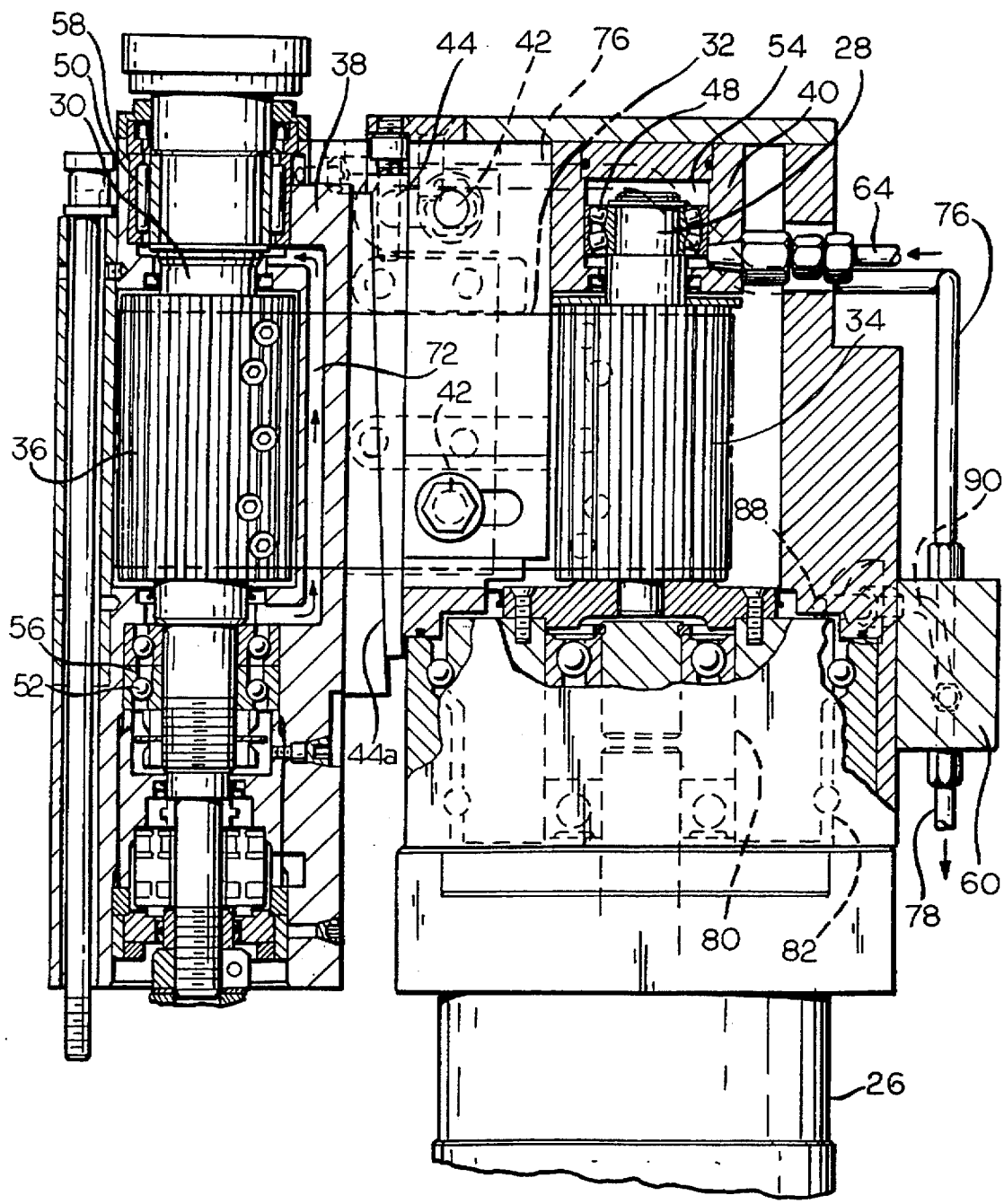
FIG. 2 is an elevational view, partly in cross-section, of one of the drive units of the gob distributor of FIG. 1.
Figure 3:
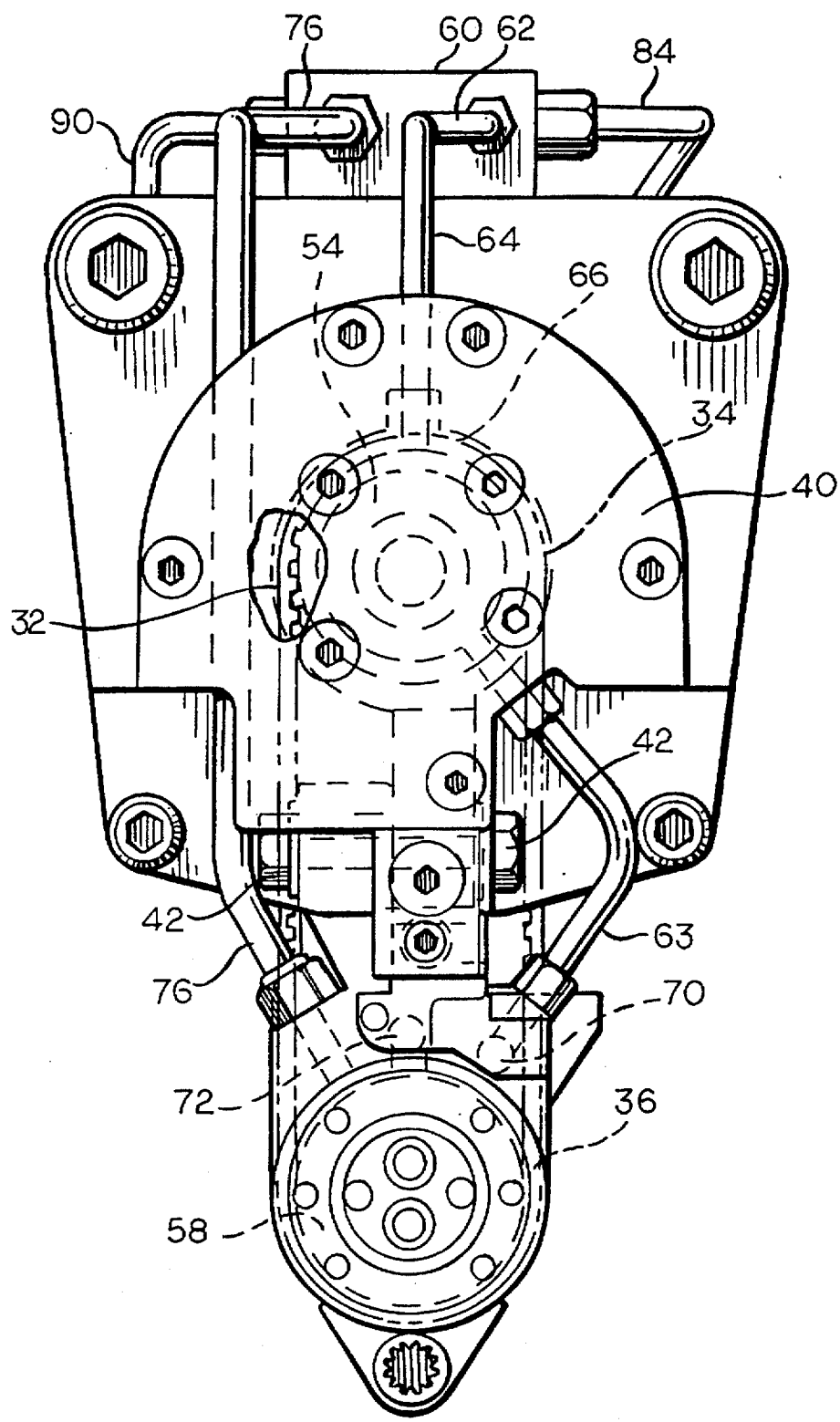
FIG. 3 is a plan view of the drive unit of FIG. 2, with part of the structure thereof being broken away for purposes of clarity.
Figure 4:
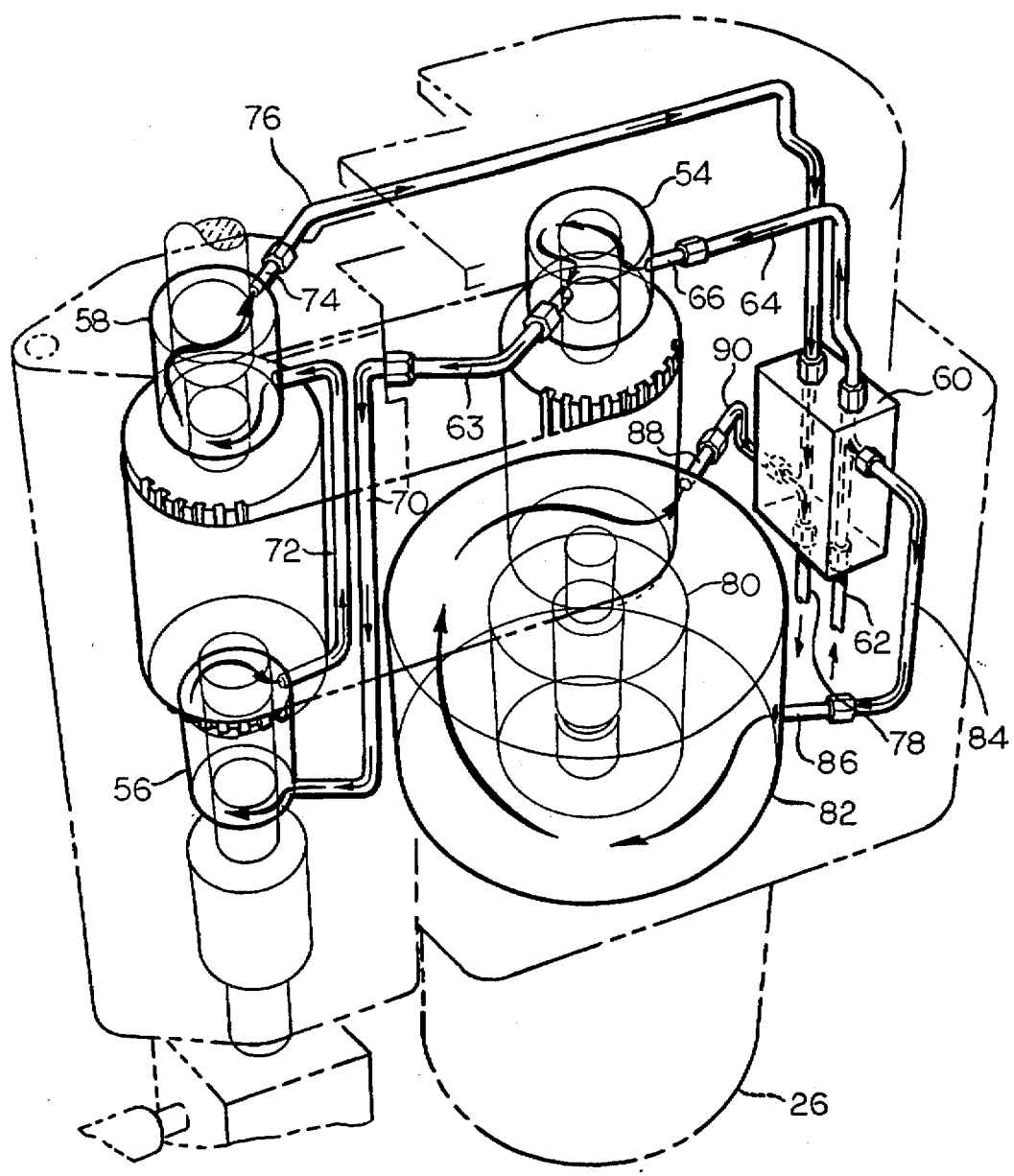
FIG. 4 is a schematic perspective view showing the flow of lubricating oil for lubricating the various bearings of the glass gob distributor of FIGS. 1–3.
Figure 5:
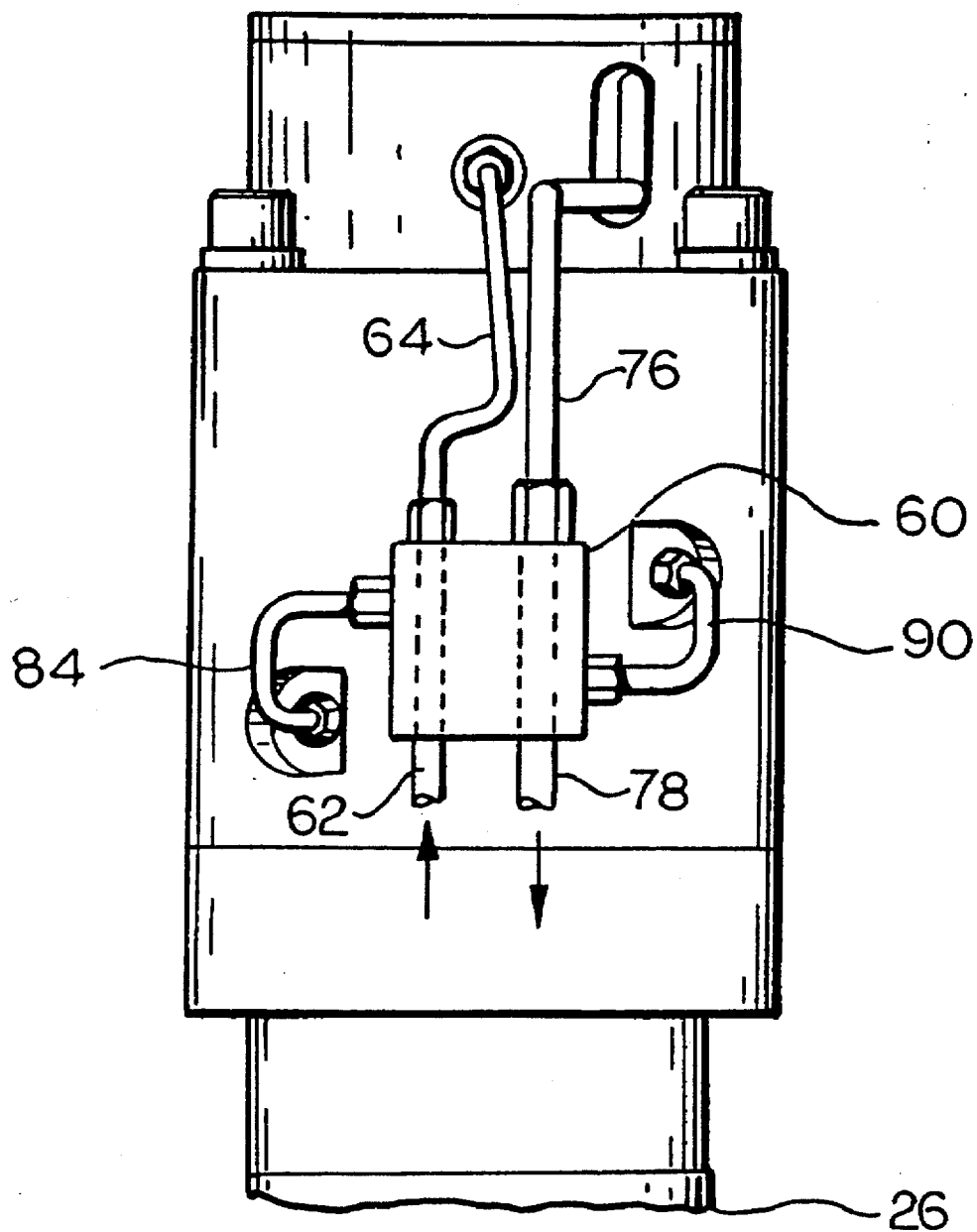
FIG. 5 is a fragmentary elevational view showing a portion of the lubricating system of FIG. 4.
Figure 6:
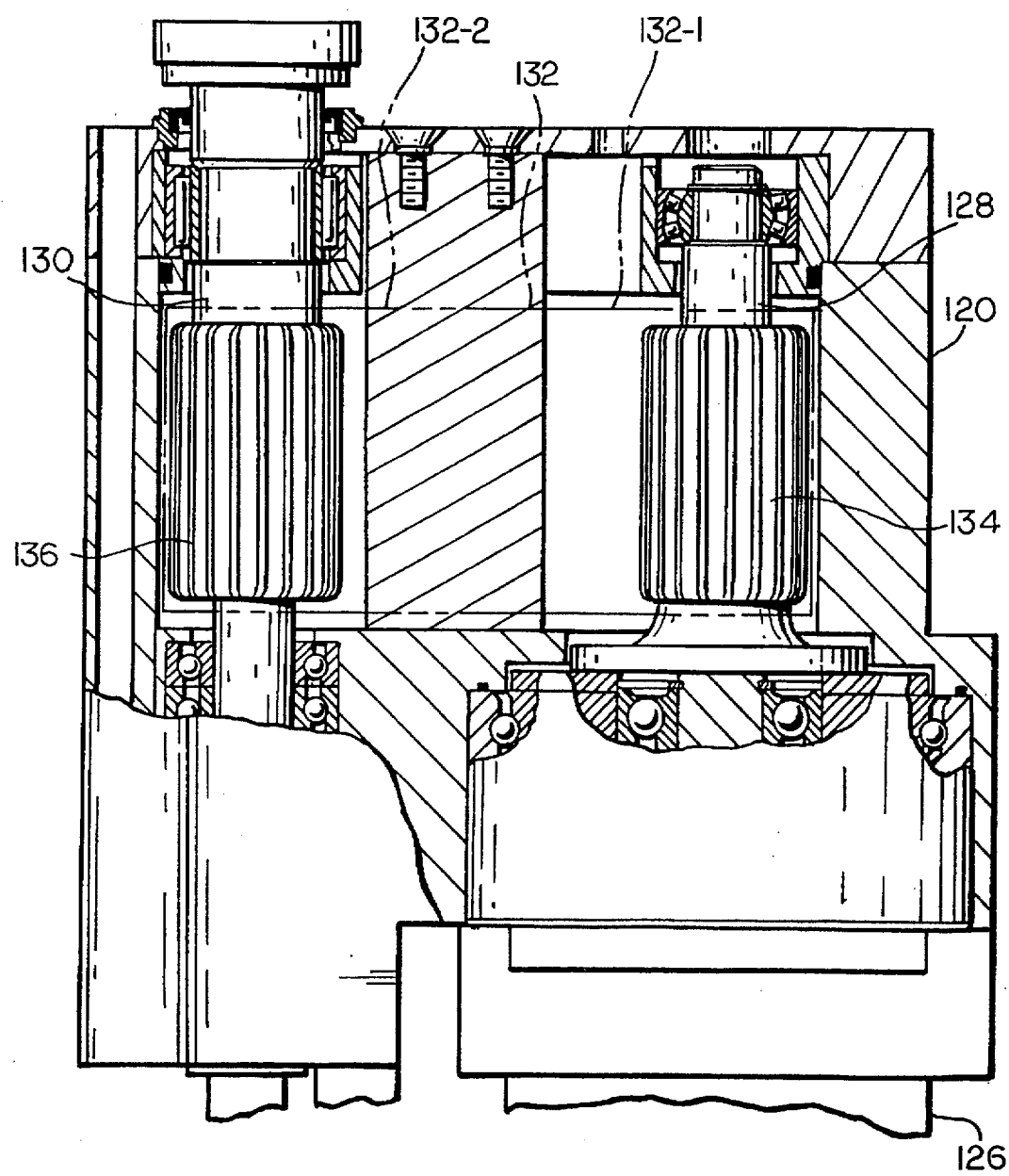
FIG. 6 is a view similar to FIG. 2 of an alternative embodiment of a drive unit for the gob distributor of the present invention.
Figure 7:
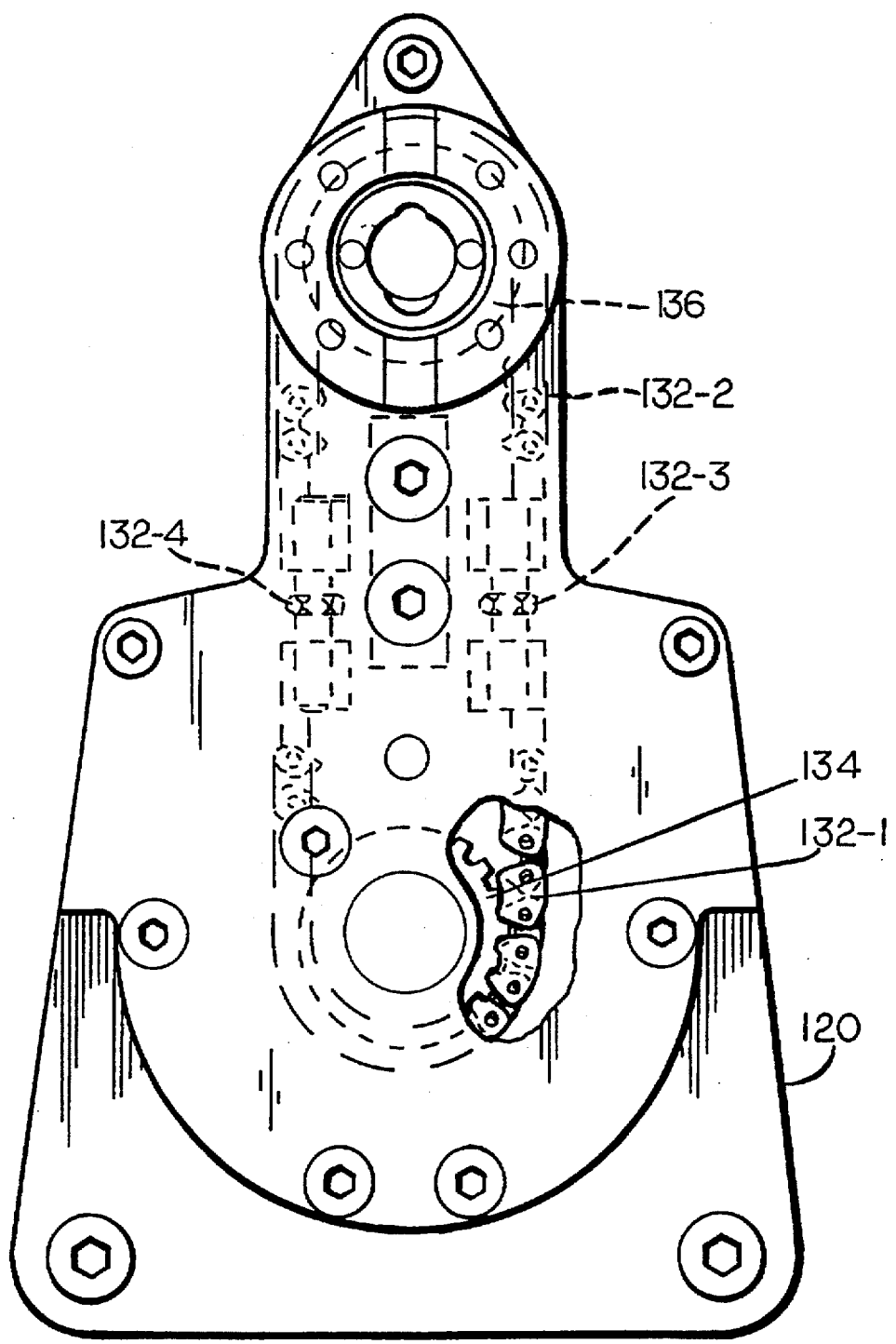
FIG. 7 is a plan view of the drive unit of FIG. 4, with a portion thereof being broken away for the sake of clarity.

FIGS. 6 and 7 illustrate an alternative embodiment of a drive unit which is alternative to the drive units 20, 22, 24 of FIG. 1, as illustrated in detail with respect to the drive unit 20 in FIGS. 2 and 3. The drive unit 120 is powered by a reversible motor that is capable of operating in an indexing fashion, preferably an a.c. servo motor, such as the motor 126 of the drive unit 60. The motor 126 of a drive unit 120, which may or may not incorporate a zero backlash gearbox, is provided with a vertically extending output shaft 128, and torque is transmitted from the output shaft 128 to a driven shaft 130 by a pair of double ended, metallic chain drive chains 132-1, 132-2, which are joined end-to-end to form an endless drive chain 132, which is trained around suitable sprockets 134, 136 on the output shaft 138 and the driven shaft 130, respectively.

The chain members 132-1, 132-2 are preferably of the silent chain type, which are made up of alternating steel links shaped so that they have straight tooth edges bearing along the entire length of the teeth of the sprockets 134, 136. Such chains are available in multiple types, preferably the "Morsel" type, which uses a rocker joint, as is known in the art.

Take-up adjustment members 132-3, 132-4 are used to join the adjacent opposed ends of the drive chains 132-1, 132-2 to one another. The adjustment members 132-3, 132-4 are used to maintain a predetermined level of tension in the drive chains 132-1, 132-2. Thus, there is no need to provide structure to change the spacing between the output shaft 138 and the driven shaft 130 to adjust the tension in the drive chains 132-1, 132-2.

The bearings of the embodiment of FIGS. 6 and 7 can be lubricated by a grease lubrication system of a type known in the prior art or they can be lubricated by a circulating pressurized oil system corresponding to that of the embodiment of FIGS. 1–5.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the equivalents thereof.

What is claimed:

1. A gob distributor for distributing gobs of molten glass from an orifice of a glass melter to a plurality of molds of a glass forming machine, said gob distributor comprising:

a.c. servo motor means having an output shaft, said motor means being operable in an oscillating manner with a plurality of indexing steps as it moves in a given arcuate direction;

a driven member spaced from and extending parallel to said output shaft;

a gob scoop, said gob scoop having an inlet end adapted to be positioned in alignment with the orifice of the glass melter and an outlet end adapted to be positioned out of alignment with the orifice of the glass melter;

means connecting said gob scoop to said driven member to be oscillated therewith; and endless positive drive means for transmitting torque from said output shaft to said driven member.

2. A gob distributor according to claim 1 wherein said endless positive drive means comprises a cogged timing belt of a non-metallic material with a plurality of spaced apart metallic reinforcing elements encased within the non-metallic material.

3. A gob distributor according to claim 2 wherein said non-metallic material is polyurethane and wherein each of said reinforcing elements is a steel cable.

4. A gob distributor according to claim 3 and further comprising:

adjustment means for adjusting the spacing between said output shaft and said driven member to adjust the tension in said cogged timing belt.

5. A gob distributor according to claim 3 wherein:

said output shaft and said driven member are spaced apart by approximately one hundred-seventy millimeters; and said cogged timing belt has a width of approximately one hundred millimeters.

6. A gob distributor according to claim 5 wherein said cogged timing belt has a tooth center to tooth center spacing of approximately ten millimeters.

7. A gob distributor according to claim 2 and further comprising:

covering means enclosing said cogged timing belt to avoid inadvertent contact between molten glass and said cogged timing belt.

8. A gob distributor according to claim 1 wherein said endless positive drive means comprises:

a pair of double-ended metallic drive chains, each with its ends disposed adjacent to the ends of the other drive chains; and adjustable length joining means joining the ends of each of the drive chains to the ends of the other of the drive chains.

9. A gob distributor according to claim 8 wherein each of the metallic drive chains is a chain of the rocker joint type.

10. A gob distributor according to claim 1 and further comprising:

first enclosed bearing means for rotatably supporting said output shaft of said motor means;

second and third enclosed bearing means for rotatably supporting said driven member, said second and third enclosed bearing means being spaced apart from one another; and lubricating oil circulating means having a source for circulating lubricating oil from said source successively through said first enclosed bearing means, said second enclosed bearing means, said third enclosed bearing means and back to said source.

11. A gob distributor according to claim 10 wherein said lubricating oil circulating means comprises conduit means, said conduit means being exposed to ambient temperature conditions to permit cooling of lubricating oil circulating therethrough.

12. A gob distributor according to claim 10 and further comprising:
    fourth enclosed bearing means for rotatably supporting said output shaft of said motor means, said fourth enclosed bearing means being spaced apart from said first enclosed bearing means; and
    second lubricating oil circulating means for circulating lubricating oil from said source through said fourth enclosed bearing means and back to said source.

13. A gob distributor according to claim 2 and further comprising:
    first enclosed bearing means for rotatably supporting said output shaft of said motor means;
    second and third enclosed bearing means for rotatably supporting said driven member, said second and third enclosed bearing means being spaced apart from one another; and
    lubricating oil circulating means having a source for circulating lubricating oil from said source successively through said first enclosed bearing means, said second enclosed bearing means, said third enclosed bearing means and back to said source.

14. A gob distributor according to claim 13 wherein said lubricating oil circulating means comprises conduit means, said conduit means being exposed to ambient temperature conditions to permit cooling of lubricating oil circulating therethrough.

15. A gob distributor according to claim 13 and further comprising:
    fourth enclosed bearing means for rotatably supporting said output shaft of said motor means, said fourth enclosed bearing means being spaced apart from said first enclosed bearing means; and
    second lubricating oil circulating means for circulating lubricating oil from said source through said fourth enclosed bearing means and back to said source.

16. A gob distributor for distributing gobs of molten glass to a plurality of sections of a glass forming machine of the individual section type, each of the sections having a plurality of sets of molds, said gob distributor comprising:
    a plurality of a.c. servo motors, each of said plurality of a.c. servo motors having an output shaft and being operable in an oscillating manner with a plurality of indexing steps as it moves in a given arcuate direction;
    a plurality of driven members, each of said driven members being spaced from and extending parallel to one of said output shafts;
    a plurality of gob scoops, each of said gob scoops having an inlet end adapted to be positioned in alignment with an orifice of a glass melter and an outlet end adapted to be positioned out of alignment with the orifice of the glass melter;
    a plurality of connecting means connecting each of said gob scoops to one of said driven members; and
    a plurality of endless positive drive means, for transmitting torque from said output shafts of each of said a.c. servo motors to each of said driven members.

17. A gob distributor according to claim 16 wherein each of said endless positive drive means comprises a cogged timing belt of a non-metallic material with a plurality of spaced apart metallic reinforcing elements encased within the non-metallic material.

18. A gob distributor according to claim 17 wherein said non-metallic material is polyurethane and wherein each of said reinforcing elements is a steel cable.

19. A gob distributor according to claim 18 and further comprising:
    a plurality of adjustment means for adjusting the spacing between each of said output shafts and each of said driven members to adjust the tension in each of said cogged timing belts.

20. A gob distributor according to claim 18 wherein:
    each of said output shafts and said each of said driven members are spaced apart by approximately one hundred-seventy millimeters; and
    each of said cogged timing belts has a width of approximately one hundred millimeters.

21. A gob distributor according to claim 20 wherein each of said cogged timing belts has a tooth center to tooth center spacing of approximately ten millimeters.

22. A gob distributor according to claim 17 and further comprising:
    covering means enclosing each of said cogged timing belts to avoid inadvertent contact between molten glass and each of said cogged timing belts.

23. A gob distributor according to claim 16 wherein each of said endless positive drive means comprises:
    a pair of double-ended metallic drive chains, each with its ends disposed adjacent to the ends of the other of the pair of drive chains; and
    adjustable length joining means joining the ends of each of the drive chains of each pair of drive chains to the ends of the other of the drive chains of the pair of drive chains.

24. A gob distributor according to claim 23 wherein each of the metallic drive chains is a chain made up of a plurality of rocker joints.

* * * * *

UNITED STATES PATENT AND TRADEMARK OFFICE
CERTIFICATE OF CORRECTION

PATENT NO. : 5,895,514
DATED : April 20, 1999
INVENTOR(S) : Frank J. DiFrank

It is certified that error appears in the above-identified patent and that said Letters Patent is hereby corrected as shown below:

Title page, reference item [73], kindly delete "Owens-Illinois Inc., Toledo, Ohio" and insert ---- Owens-Brockway Glass Container Inc., Toledo, Ohio ----.

Signed and Sealed this

Eithteenth Day of July, 2000

*Attest:*

Q. TODD DICKINSON

*Attesting Officer*  *Director of Patents and Trademarks*